United States Patent [19]

Gardner

[11] 4,315,075

[45] Feb. 9, 1982

[54] METHODS OF REDUCING SMOKE EVOLUTION FROM BURNING NEOPRENE FOAM AND NEOPRENE FOAM PRODUCTS PRODUCED THEREBY

[75] Inventor: Esther C. Gardner, Westmoreland, Pa.

[73] Assignee: Toyad Corporation, Latrobe, Pa.

[21] Appl. No.: 197,110

[22] Filed: Oct. 15, 1980

[51] Int. Cl.$^3$ .............................................. C08J 9/30
[52] U.S. Cl. ............................... 521/71; 260/45.7 R; 521/92; 521/150; 521/907
[58] Field of Search .............. 521/92, 71; 260/45.7 R

[56] References Cited

U.S. PATENT DOCUMENTS

| | | | |
|---|---|---|---|
| 3,639,298 | 2/1972 | Lister et al. | 521/71 |
| 3,699,041 | 10/1972 | Sanderford et al. | 521/71 |
| 3,740,357 | 6/1973 | Wax | 521/71 |
| 3,874,889 | 4/1975 | Geppert et al. | 521/71 |
| 4,216,130 | 8/1980 | Rigge et al. | 521/71 |

*Primary Examiner*—Morton Foelak
*Attorney, Agent, or Firm*—Buell, Blenko, Ziesenheim & Beck

[57] ABSTRACT

A low smoke neoprene latex foam having physical properties suitable for cushioning and method of making the same are provided in which at least 200 parts of hydrated alumina are added per 100 parts of dry neoprene latex with the hydrated alumina being at least 66% in the size range 40 microns and larger and the balance in the size range below 40 microns.

5 Claims, No Drawings

METHODS OF REDUCING SMOKE EVOLUTION FROM BURNING NEOPRENE FOAM AND NEOPRENE FOAM PRODUCTS PRODUCED THEREBY

Neoprene is much used for the manufacture of foam products for upholstery cushioning, mattresses and a variety of similar products which are used in homes, businesses and the like. Neoprene (polychloroprene) is an elastomer which resists burning but will, in the presence of heat, evolve large amounts of smoke. One of the most serious sources of deaths in fires in homes and businesses is smoke inhalation. Recognizing this problem, manufacturers of neoprene foam products have long sought a solution to this excess smoking problem. The most successful method of reducing smoke evolution and of controlling burning of neoprene has been the addition of high levels of hydrated alumina in the neoprene compound used for foaming. It is desirable to achieve a maximum value of $D_m=300$ using an NBS Smoke Chamber, ASTM-E-662-79, sample thickness 1", Flaming Mode.

In order to achieve this reduction the neoprene foam industry has used small to medium particle size hydrated aluminas (0.5 microns to 30 microns in size) either in a single size or mixtures of sizes. The reasoning behind this use of small to medium particle size hydrated aluminas is that the smaller size particles have a large surface area available to retard burning. Unfortunately, however, as the amount of hydrated alumina is increased, the physical properties of the foam are decreased. The upper limit to the amount of small to medium particle size hydrated alumina which can be added to neoprene foam is about 150 parts per 100 parts of dry latex. Beyond this point, the neoprene foam has such poor physical properties that it is not suitable for cushioning, yet, at 150 parts hydrated alumina per 100 parts of dry latex, the smoke evolution is not sufficiently reduced.

I have discovered that by adding large particle size hydrated alumina (40 microns or larger), contrary to the general belief and practices of the industry, it is possible to incorporate 200 parts and more of hydrated alumina per 100 parts of dry latex without seriously degrading the physical properties important in cushioning, particularly tensile strength and elongation. At a level of 200 parts of 40 micron and larger hydrated alumina per 100 parts of dry latex I have surprisingly achieved Smoke Density $D_{max}$ levels of 300.

I have found that it is possible to blend small to medium size (0.5 to 30 micron) particles of hydrated alumina with the large particle size (40 micron and larger) hydrated aluminas, however, there appears to be a critical ratio between the two which cannot be exceeded while still retaining the desired physical properties. That critical ratio is about 66 parts of large particle size to 34 parts of small to medium particle size hydrated alumina per 100 parts of dry latex, i.e., a ratio of about 2/1 of large particles to small/medium size particles. If this ratio is exceeded, the physical properties of the foam deteriorate so that it is no longer suitable for cushioning purposes.

The invention can perhaps be best understood by reference to the following examples.

EXAMPLE I

Two neoprene foam cushioning products were prepared to produce products having substantially identical physical properties suitable for cushioning. In one foam aluminum hydrate having a size less than 40 microns was added in accordance with conventional practice to a level of 110 parts of hydrate per 100 parts of dry neoprene latex to the point where physical properties begin to deteriorate. In the other foam aluminum hydrate, larger than 40 microns was added in the amount of 200 parts of hydrate per 100 parts of dry neoprene latex. The Optical Smoke Density, 1" sample, Flaming Mode was determined by the ASTM-E662-79 method using an NBS Smoke Chamber. The results are tabulated below at various time periods.

| Time Period | Smoke Density 110 parts | Smoke Density 200 parts |
| --- | --- | --- |
| D 90 sec | 120 | 59 |
| D 4 min | 245 | 127 |
| D max | 392 | 237 |

As the foregoing data indicates, the product made by the conventional practice far exeeded the 300 permissible level at D max whereas the foam prepared according to this invention was well below that level. This is a very important and significant reduction in smoke level.

In the foregoing specification I have set out certain preferred practices and embodiments of my invention, however, it will be understood that this invention may be otherwise embodied within the scope of the following claims.

I claim:

1. A low smoke neoprene latex foam composition having physical properties suitable for cushioning, consisting essentially of neoprene latex incorporating at least 200 parts of hydrated alumina per 100 parts of dry neoprene latex, said hydrated alumina being made up of at least 66% of large particle size hydrated alumina in the size range of 40 microns and larger and the balance hydrated alumina in the size range below 40 microns.

2. A low smoke neoprene latex foam as claimed in claim 1 wherein the hydrated alumina is all in the size range 40 microns and larger.

3. A low smoke neoprene latex foam as claimed in claim 1 containing 200 parts of hydrated alumina of the size range 40 microns and larger per 100 parts dry neoprene latex.

4. The method of forming a low smoke neoprene latex foam having a maximum value of $D_m=300$ using an NBS Smoke Chamber, ASTM-E-662-79, sample thickness 1", Flaming Mode and having physical properties suitable for cushioning comprising the step of incorporating into a neoprene latex at least 200 parts of hydrated alumina per 100 parts of dry neoprene latex, said hydrated alumina being made up of at least 66% large particle size hydrated alumina in the size range 40 microns and larger and the balance hydrated alumina in the size range below 40 microns and foaming the latex.

5. The method as claimed in claim 4 wherein the hydrated alumina is all 40 microns and larger.

* * * * *